Patented May 9, 1950

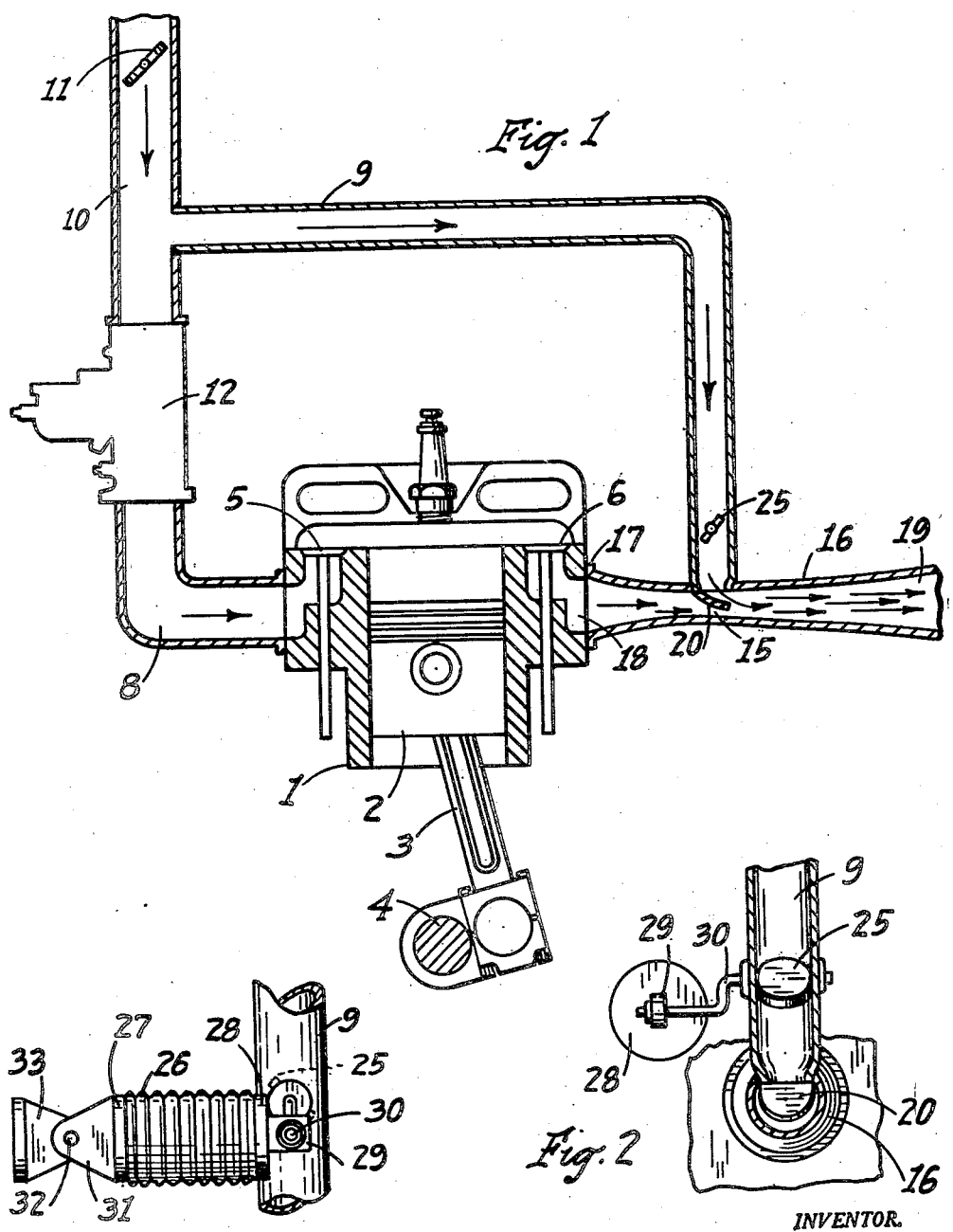

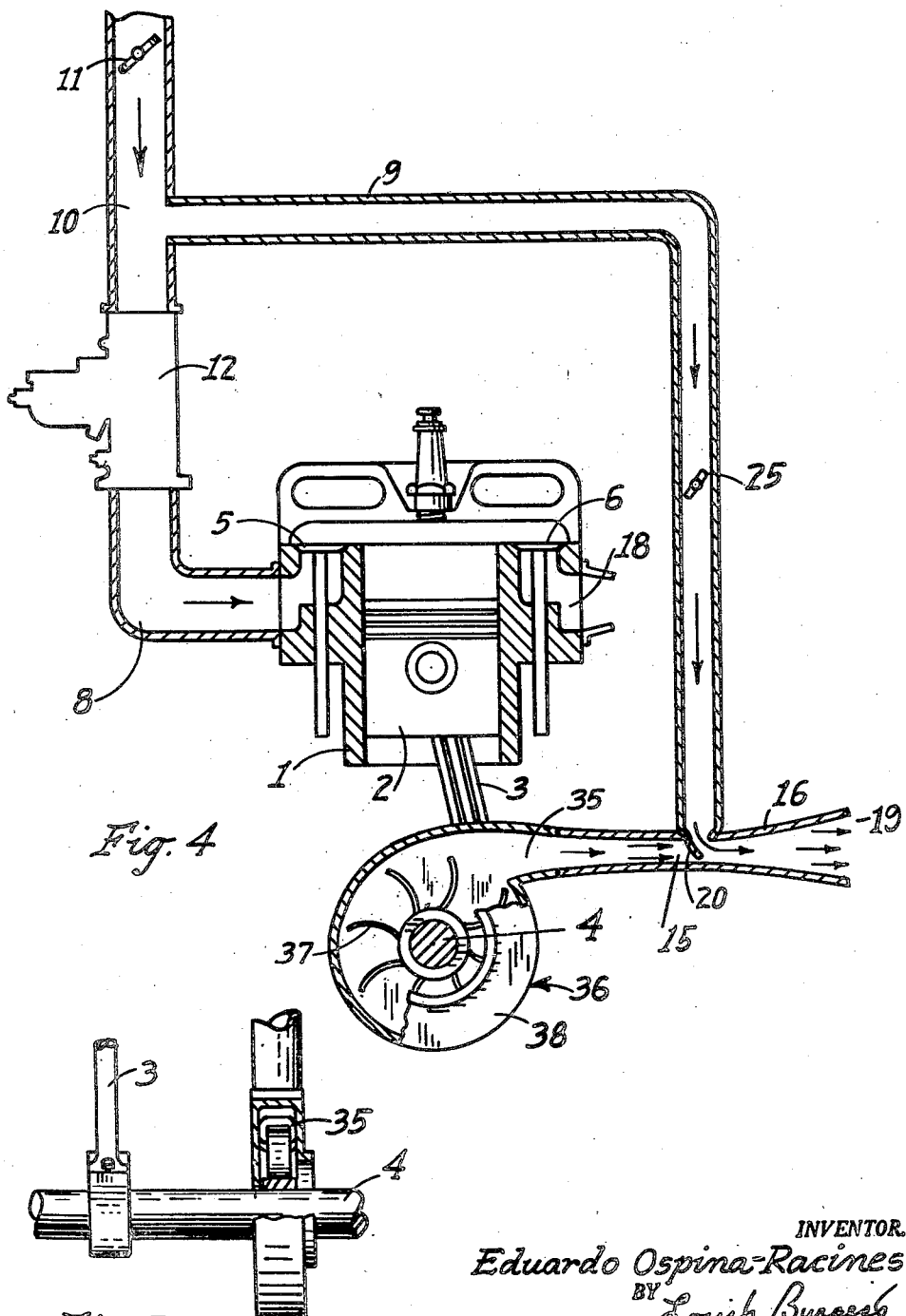

2,506,810

UNITED STATES PATENT OFFICE 2,506,810

COMPRESSION CONTROL FOR INTERNAL-COMBUSTION ENGINES

Eduardo Ospina-Racines, Bogota, Colombia

Application February 18, 1948, Serial No. 9,064

13 Claims. (Cl. 123—1)

The present invention embodies a more efficient compression control for internal combustion engines of the spark ignition type to compensate for variations in the ambient air pressure so as to adjust the air pressure to the corresponding octane value of the motor fuel being burned.

The efficient operation of internal combustion engines such as used in automobiles, likewise aircraft, depends on the proper adjustment of three variables. The first of these is the compression ratio of the engine. For stationary, automobile and aircraft engines this ratio may run from 4:1 to as high as 7:1. The second variable is the ambient air pressure. This varies according to the altitude above sea level, diminishing with higher altitudes, the maximum air pressure being encountered at sea level, when no supercharging is used for the engine, which is the case for aircraft engines. The third variable factor is the octane number of the motor fuel burned. Commercial grades of motor gasoline have octane numbers running between 45 and 70 and when octane promoters are added, such as tetra-ethyl-lead, the octane number of the motor fuel may be increased to 100 or even higher.

In general it may be stated that the higher the compression ratio of an engine the higher the octane value required for the motor fuel. Likewise the higher the pressure of the air fed to an internal combustion engine, the higher the octane number required for the motor fuel and vice versa, the lower the air pressure, the lower the octane number reqired of the motor fuel for a given engine.

It is obvious, therefore, that for a given engine, one of the variables is constant, namely, the compression ratio. For efficient operation of the engine, therefore, there are two variables which must be adjusted, the air pressure of the incoming air fed to the engine and the octane number of the motor fuel.

Today in the case of stationary and modern automobile high compression engines, there are no means to adjust the air pressure and the operator of these engines is called upon to use high octane number fuels as otherwise a detrimental knock results with the use of economical, low cost, low octane number gasolines. In the case of aircraft engines, the air pressure of the air being fed to the engine is regulated by superchargers.

My invention furnishes means of varying the pressure of the incoming air being fed to the internal combustion engine so as to obtain a maximum efficiency and permits the use of higher compression ratio engines while making use of economical low octane gasolines and is applicable to stationary, automobile as well as aircraft engines.

In accordance with my invention, I make provision for reducing the pressure of the incoming air, either manually or automatically, so that the cylinder compression will not be excessive when the engine is operated with a given octane number fuel or at a lower altitude than that specified. I achieve this by throttling the air entering the carburetor and/or aspirating part of the incoming air to an extent sufficient to maintain within the carburetor manifold that pressure at which the engine is capable of efficient operation for the given octane number of the motor fuel and compression ratio of the engine.

More specifically, this is accomplished by means of an auxiliary air conduit connected to the carburetor air intake debouching into the throat of a Venturi tube through which a gas, for instance air or exhaust gas, is caused to flow. The downstream end of the Venturi tube discharges into the open atmosphere, while the upstream end is subject to a pressure in excess of that of the atmosphere in which the engine is operating.

In one embodiment of my invention the aspirating gas flowing through the Venturi tube is the gaseous combustion products of the engine itself obtained from the exhaust manifold of the engine. In an alternative embodiment of my engine, the aspirating gas flowing through the Venturi tube is obtained from a separate centrifugal compressor driven by the engine.

Further characteristics and advantages of my invention will appear from the following detailed description read in conjunction with the drawing, in which:

Fig. 1 is a diagrammatic, cross-sectional view, showing one embodiment of my invention;

Fig. 2 is a cross-sectional view, on an enlarged scale, of one of the details of construction shown in Fig. 1;

Fig. 3 is a side view of the detail of construction shown in Fig. 2;

Fig. 4 is a diagrammatic, cross-sectional view showing a second embodiment of my invention and Fig. 5 is a side view of a detail of construction shown in Fig. 4.

Referring to Figs. 1 and 4, in which like parts have been designated with like numerals, I represents the cylinder lining of one cylinder of an internal combustion engine of the spark ignition type comprising piston 2, connecting rod 3, crank shaft 4, inlet valve 5, exhaust valve 6, and intake manifold 8. Auxiliary air conduit 9 branches off from carburetor air intake 10 between main carburetor air throttle 11 and carburetor 12.

Referring now to Fig. 1, which depicts one specific embodiment of my invention, as applied, for purposes of illustration, to a single cylinder engine of the spark ignition type, auxiliary air conduit 9 debouches into throat 15 of Venturi tube 16, end 17 of which forms a continuation of exhaust port 18, while end 19 discharges into the open atmosphere. Of course, in the case of a multicylinder engine, end 17 will be connected to the exhaust manifold rather than to the exhaust port. However, in both cases, upon operation of the engine, the exhaust gases are expelled through Venturi tube 16. The lower pressure at throat 15, due to the constriction there of tube 16 and the jet action of the exhaust gases, abstracts some of the air flowing to carburetor 12 through intake 10 via auxiliary air conduit 9. This abstracted air then passes to the atmosphere through end 19 of tube 16. Baffle 20 (Figs. 1, 2 and 4) arranged in throat 15 of tube 16 serves not only to prevent the gases flowing through said tube 16 from entering auxiliary air conduit 9 but also to further constrict the free flow area of throat 15 and thus further increase the jet action of the gases passing through tube 16. In this way the quantity of air and therefore the pressure of the air in air intake 10 is considerably reduced. Air throttle 25 provided in auxiliary air conduit 9 permits regulation of the extent to which the pressure obtaining in carburetor intake 10 is reduced. It is evident that the greater the opening of throttle 25, the lesser the air pressure obtaining in carburetor air intake 10, for a given position of throttle 11. Thus, for a given location above sea level, the air throttle is to be adjusted with a lesser opening than at sea level, and a greater opening than at higher altitudes. Thus with air throttle 25 fully open in an engine designed for optimum operation at 18,000 feet altitude, the pressure obtaining in carburetor intake 10 at sea level will be approximately ½ atmosphere. By means of throttle 25 it is therefore possible to adjust pressure obtaining in carburetor intake 10 so as to obtain maximum power and freedom from knocking at sea level as well as at higher altitudes.

Referring now to Figs. 4 and 5 in which a second embodiment of my invention is shown, it is noted that in this case the upstream end of Venturi tube 16, instead of being connected to exhaust port 18, is connected to air discharge port 35 of centrifugal blower 36. Impeller 37 of this blower is mounted on crank shaft 4 and rotates within stationary casing 38. This casing may be supported in any manner, not shown in the drawing. Alternatively impeller 37 may be connected to crank shaft 4 through intermediate gearing such that it rotates at a substantially higher rate than crank shaft 4. This embodiment of my invention is better suited for use in single or two cylinder engines than the specific embodiment described immediately above, in view of the fact that flow of the exhaust gases through the Venturi tube, in accordance with the embodiment shown in Fig. 1, would be of an intermittent nature in the case of such single or two cylinder engines.

While throttle 25 (Figs. 1 and 4) may be manually controlled, it is particularly advantageous to provide for its automatic regulation in dependence on the prevailing atmospheric pressure at which the engine is operating. This may be achieved (Figs. 2 and 3) by means of copper bellows 26 forming with end pressure plates 27 and 28 a sealed air container, capable of elongating in response to diminished external pressure and of contracting in response to increased external pressure. End plate 28 is provided with bracket 29, in which there is rotatably mounted bell arm 30 serving to actuate throttle 25 within conduit 9. Bracket 31 forming a continuation of end plate 27 is pivoted at 32 to fixed bracket 33 so as to allow free rotational movement of bell arm 30, and therefore of throttle 25, as bellows 26 expand and contract in dependence upon variations of atmospheric pressure. Bellows 26 are so adjusted and positioned with respect to bell arm 30 of throttle 25 that an increase in atmospheric pressure serves to open said throttle, said opening being a maximum at the highest ambient atmospheric pressure at which use of the engine is contemplated.

The foregoing description is for purposes of illustration and not of limitation and it is therefore my intention that the invention be limited only by the following claims or their equivalent wherein I have endeavored to claim broadly all inherent novelty.

I claim:

1. In an internal combustion engine of the spark-ignition type including a carburetor and a carburetor air intake, the improvement comprising a conduit branching off from said intake, a Venturi tube into the throat of which said conduit debouches, and means adapted to provide flow through said Venturi tube proportional to the speed of said engine.

2. The improvement according to claim 1, comprising, in addition, control means adapted to automatically regulate said air throttle in accordance with the ambient atmospheric pressure.

3. The improvement according to claim 1, comprising, in addition, a baffle in said Venturi throat adapted to prevent flow from said Venturi tube into said conduit.

4. The improvement according to claim 1, wherein one end of said Venturi tube is connected to the exhaust line of said internal combustion engine.

5. The improvement according to claim 4, wherein the other end of said Venturi tube is open to atmospheric pressure.

6. The improvement according to claim 5, comprising, in addition, control means adapted to automatically regulate said air throttle in accordance with the ambient atmospheric pressure.

7. The improvement according to claim 6, comprising, in addition, a baffle in said Venturi throat adapted to prevent flow from said Venturi tube into said conduit.

8. The improvement according to claim 1, wherein said means comprises a blower arranged to provide air flow through said Venturi tube.

9. The improvement according to claim 8, wherein said blower is driven from the drive shaft of said internal combustion engine.

10. The improvement according to claim 9, comprising, in addition, control means adapted to automatically regulate said air throttle in accordance with the ambient atmospheric pressure.

11. The improvement according to claim 10, comprising, in addition, a baffle in said Venturi throat adapted to prevent flow from said Venturi tube into said conduit.

12. In an internal combustion engine of the spark-ignition type including a carburetor and a carburetor air intake, the improvement comprising a conduit branching off from said intake, a Venturi tube into the throat of which said conduit debouches, a regulatable air throttle in said conduit, means adapted to provide flow through said Venturi tube and a baffle in said Venturi throat adapted to prevent flow from said Venturi tube into said conduit.

13. In an internal combustion engine of the spark-ignition type including a carburetor and a carburetor air intake, the improvement comprising a conduit branching off from said intake, a Venturi tube into the throat of which said conduit debouches, a regulatable air throttle in said conduit, and a blower arranged to produce air flow through said Venturi tube.

EDUARDO OSPINA-RACINES.

REFERENCES CITED

The following references are of record in the file of this patent:

UNITED STATES PATENTS

| Number | Name | Date |
| --- | --- | --- |
| 2,404,324 | Staley | July 16, 1946 |

FOREIGN PATENTS

| Number | Country | Date |
| --- | --- | --- |
| 374,524 | Germany | Apr. 24, 1923 |